United States Patent
Cho et al.

(10) Patent No.: US 6,952,506 B2
(45) Date of Patent: Oct. 4, 2005

(54) DEVICE FOR ADDING AND DROPPING OPTICAL SIGNALS

(75) Inventors: Seung-Hyun Cho, Kuri (KR);
Byoung-Whi Kim, Anyang (KR);
Hyeong-Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 140 days.

(21) Appl. No.: 10/697,146

(22) Filed: Oct. 29, 2003

(65) Prior Publication Data

US 2004/0234196 A1 Nov. 25, 2004

(30) Foreign Application Priority Data

May 22, 2003 (KR) .............................. 10-2003-0032587

(51) Int. Cl.[7] .................................................. G02B 6/28
(52) U.S. Cl. .......................................... 385/24; 385/33
(58) Field of Search ........................ 385/15, 24, 33–39

(56) References Cited

U.S. PATENT DOCUMENTS

| | | | |
|---|---|---|---|
| 4,244,045 A | 1/1981 | Nosu et al. | |
| 5,629,995 A | 5/1997 | Duck et al. | |
| 5,652,814 A | 7/1997 | Pan et al. | |
| 6,125,221 A | * | 9/2000 | Bergmann et al. ............ 385/33 |
| 6,751,373 B2 | * | 6/2004 | Jeong .......................... 385/24 |

FOREIGN PATENT DOCUMENTS

JP    2001-217777    8/2001

* cited by examiner

*Primary Examiner*—Phan T. H. Palmer
(74) *Attorney, Agent, or Firm*—Blakely, Sokoloff, Taylor & Zafman

(57) ABSTRACT

Disclosed is the device for adding and dropping optical signals using a bulk dielectric optical thin film and four lens elements. To achieve this purpose, the bulk dielectric optical thin film and the four lenses are combined to add/drop optical signals corresponding to predetermined wavelengths.

7 Claims, 6 Drawing Sheets

PRIOR ART

FIG.4

PRIOR ART

DEVICE FOR ADDING AND DROPPING OPTICAL SIGNALS

CROSS REFERENCE TO RELATED APPLICATION

This application is based on Korea Patent Application No. 2003-32587 filed on May 22, 2003 in the Korean Intellectual Property Office, the content of which is incorporated herein by reference.

BACKGROUND OF THE INVENTION (a) Field of the Invention

The present invention relates to a device for adding and dropping optical signals. More specifically, the present invention relates to a device for adding and dropping optical signals of predetermined wavelengths without interaction in the WDM (wavelength division multiplexing) based optical communication systems.

(b) Description of the Related Art

Bulk dielectric optical thin films are widely known as filter elements in optical communication systems. Directions and locations of the dielectric optical thin films fixed in a wavelength filter unit define wavelengths of light transmitted through or reflected from the dielectric optical thin films.

The bulk dielectric optical thin films are used as filter elements that have various characteristics according to substances used for forming the films and the thickness of deposited films. The filter elements include bandpass filters, short-wavelength pass filters, and long-wavelength pass filters.

The bulk dielectric optical thin films generally transmit or reflect optical signals corresponding to specific wavelengths, and accordingly, they are mainly used as bandpass filters.

In the case of three-port wavelength selective filters using the bulk dielectric optical thin films, a waveguide for adding and dropping is required to guide the optical signals corresponding to a predetermined wavelength region reflected by the bulk dielectric optical thin film.

In general, the three-port wavelength selective filter elements transmit the optical signals corresponding to specific wavelengths, and reflect other signals.

Therefore, the three-port wavelength selective filter elements are generally used as bandpass filters or wavelength extraction filter elements.

Figure 1:
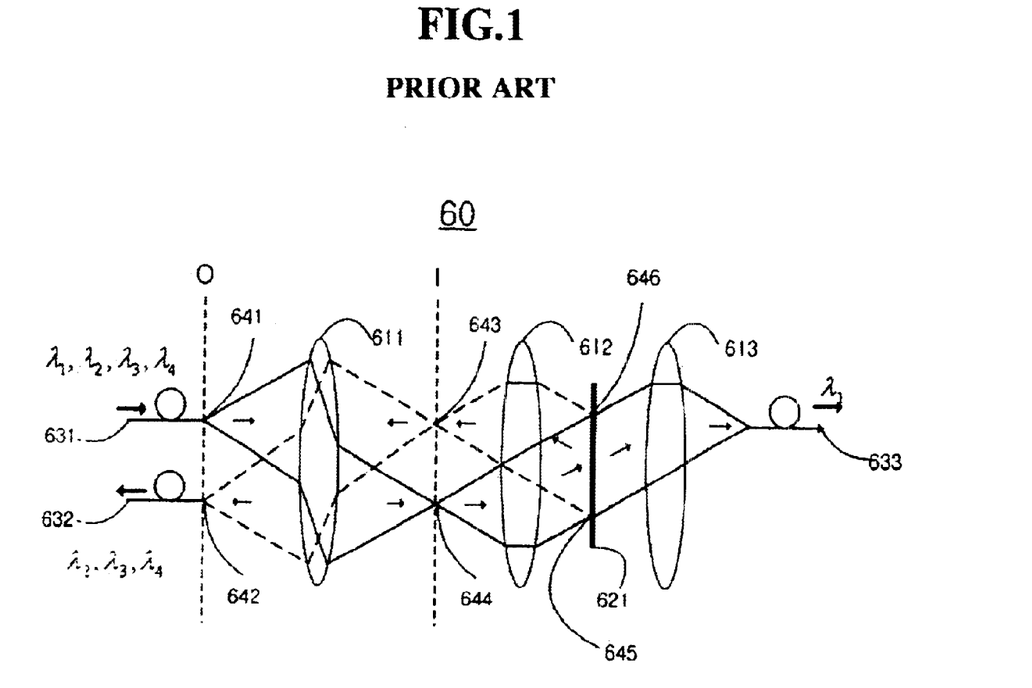
FIG. 1 shows a brief diagram of a three-port wavelength selective filter using a bulk dielectric optical thin film and an operation principle of the filter used as a wavelength division demultiplexer.

FIG. 1 shows a brief diagram of a three-port wavelength selective filter element.

As shown, the three-port wavelength selective filter 60 comprises a first focusing lens 611, a collimating lens 612, a second focusing lens 613, a bulk dielectric optical thin film 621, optical fibers 631, 632, and 633, and a dual fiber termination 641/642.

A pair of optical fibers 631 and 632 forms a first dual-fiber termination and are disposed to couple light into and out of first focusing lens 611. In most conventional arrangements, the optical fibers 631 and 632 are affixed within a single unit, such as a ferrule, where the intra fiber spacing is fixed and cannot be adjusted.

An embodiment comprising a second focusing lens 613 and a third optical fiber 633 is disposed beyond a bulk dielectric optical thin film filter element 621 and is used to capture the filtered optical signal passing therethrough.

As shown in FIG. 1, the terminations of the optical fibers 631 and 632, denoted as 641 and 642, respectively, are positioned at the object plane of focusing lens 611. The object plane is indicated by the dashed vertical line designated "O" in FIG. 1. Focusing lens 611 is chosen so as to provide nominal 1-to-1 imaging of terminations 641 and 642 (noted in the inverted forms as 643 and 644) along the image plane, designated by the dashed vertical line "I" in FIG. 1.

When the three-port wavelength selective filter is used as a WDM demultiplexer, the input optical fiber 631 is used as input means for a plurality of WDM signals having different wavelengths.

For example, let it be assumed that optical signals having center wavelengths at $\lambda_1$, $\lambda_2$, $\lambda_3$, and $\lambda_4$ are injected into the input optical fiber 631.

The optical signals proceed along the input optical fiber 631, and enter a free space in a device 60 through the termination 641.

The four optical signals are passed through the focusing lens 611, and are focused at the point 644 on the image plane I. The signals pass through the point 644 and proceed to the collimating lens 612, which controls the four wavelength division multiplexed optical signals to be dispersed in parallel and be incident upon the bulk dielectric optical thin film 621.

The bulk dielectric optical thin film 621 transmits optical signals corresponding to predefined wavelengths, and reflects optical signals corresponding to other wavelengths. The signals reflected from the bulk dielectric optical thin film 621 are passed back through the collimating lens 612 to proceed in the opposite direction of the incidence direction, and are focused at the point 643 on the image plane I. They are then passed through the focusing lens 611 to focus at the termination 642 of the optical fiber 632, and are transmitted through the output optical fiber 632.

Figure 2:
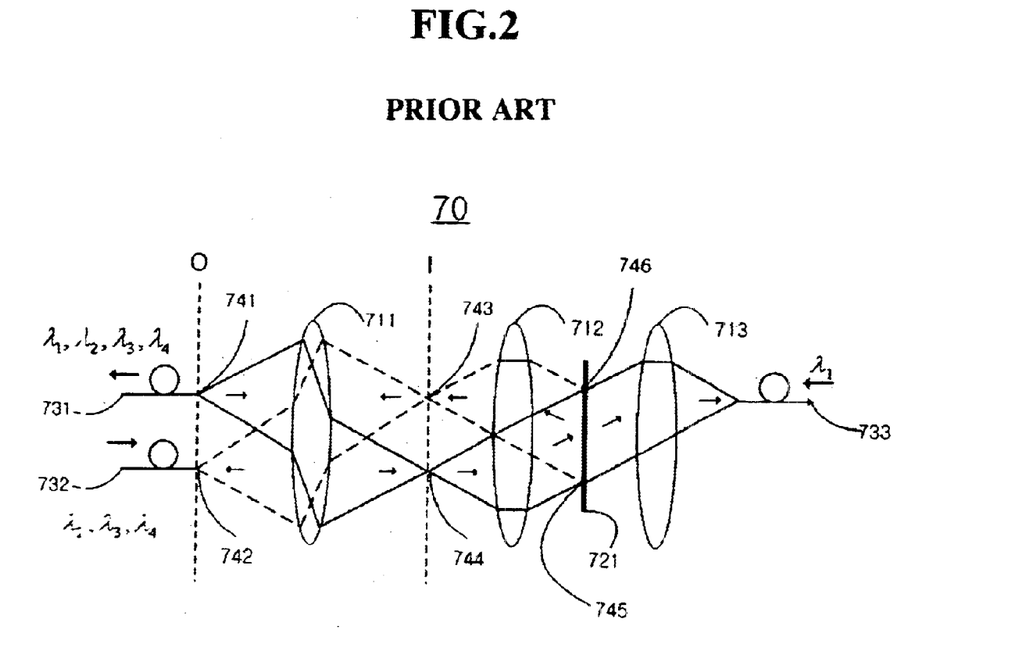
FIG. 2 shows-a brief diagram of a three-port wavelength selective filter using a bulk dielectric optical thin film and an operation principle of the filter used as a wavelength division multiplexer.

FIG. 2 shows an operation principle of the three-port wavelength selective filter element used as a multiplexer.

As shown, the three-port wavelength selective filter element 70 used as a multiplexer, that is to combine optical signals having different wavelengths onto a single optical fiber.

In this case, fibers 732 and 733 are the "input" fibers and a bulk dielectric optical thin film 721 functions to combine all four wavelengths onto output fiber 731 and propagates (in the reverse direction—that is from right to left) through device 70 so as to be coupled into "output fiber 731. Similarly, $\lambda_2$, $\lambda_3$, and $\lambda_4$ are coupled into fiber 732.

The input optical signal having a center wavelength at $\lambda_1$ is provided to the optical fiber 733 positioned in the rightmost part, and it passes through the focusing lens 713 to proceed through the bulk dielectric optical thin film 721 and the collimating lens 712, and then to the output optical fiber 731 after passing through the focusing lens 711.

In the same manner, other optical signals having the center wavelengths at $\lambda_2$, $\lambda_3$, and $\lambda_4$ are injected into the optical fiber 732 to proceed. The proceeding optical signals reflect from the bulk dielectric optical thin film 721, and the reflected optical signals are transmitted through the optical fiber 731. Therefore, since the optical signals having the center wavelengths at $\lambda_1$, $\lambda_2$, $\lambda_3$, and $\lambda_4$ are multiplexed and transmitted through the optical fiber 731, the three-port wavelength selective filter element 70 functions as a multiplexer.

Figure 3:
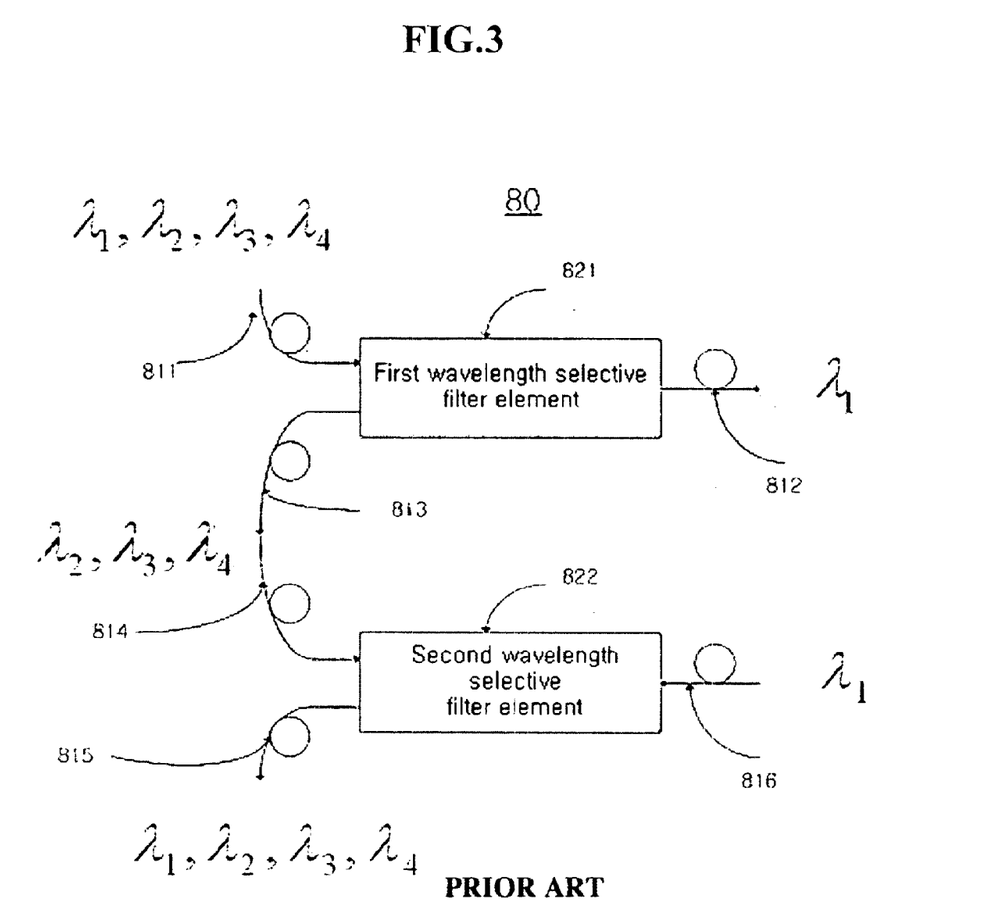
FIG. 3 shows a conventional device for adding and dropping optical signals using a three-port wavelength selective filter element.

FIG. 3 shows an exemplary filtering device for adding and dropping optical signals utilizing a plurality of filtering unit.

The device 80 includes two separate wavelength selective filter elements 821 and 822 having a multiplexer and demultiplexer function to provide a function of adding and dropping optical signals.

An input fiber 811 has a plurality of separate signals propagating therealong, and is used as the input to the first filter element 821. As will be discussed below, a first filter element 821 is designed to pass the signal propagating at wavelength $\lambda_1$ and reflect all others. The reflected signals pass a second time through the left hand side of first filter element 821 (as with the arrangement of FIG. 1) and are coupled into a second fiber 813. The second fiber 813 is then used as the input fiber 814 to second filter element 822, where second filter element 822 is designed to pass the signal propagating at $\lambda_1$ and reflect all others. The reflected waves then propagate back through the second filter element 822 into a third fiber 815.

The method of dropping predetermined channel signals from optical signals of multi-wavelengths through the output optical fiber 812 of the first wavelength selective filter element 821 is referred to as an optical signal dropping function.

When an optical signal having the center wavelength at $\lambda_1$ is injected into another input optical fiber 816 of the second wavelength selective filter element 822, the second wavelength selective filter element 822 transmits the optical signal corresponding to $\lambda_1$, and the optical signal proceeds to the output optical fiber 815.

Accordingly, the transmitted optical signals from the output optical fiber 815 comprise all injected optical signals from $\lambda_1$ to $\lambda_4$. The method of adding optical signals through the optical fiber 816 and dropping optical signals from the optical fiber 815 is referred to as an optical signal adding function.

Figure 4:
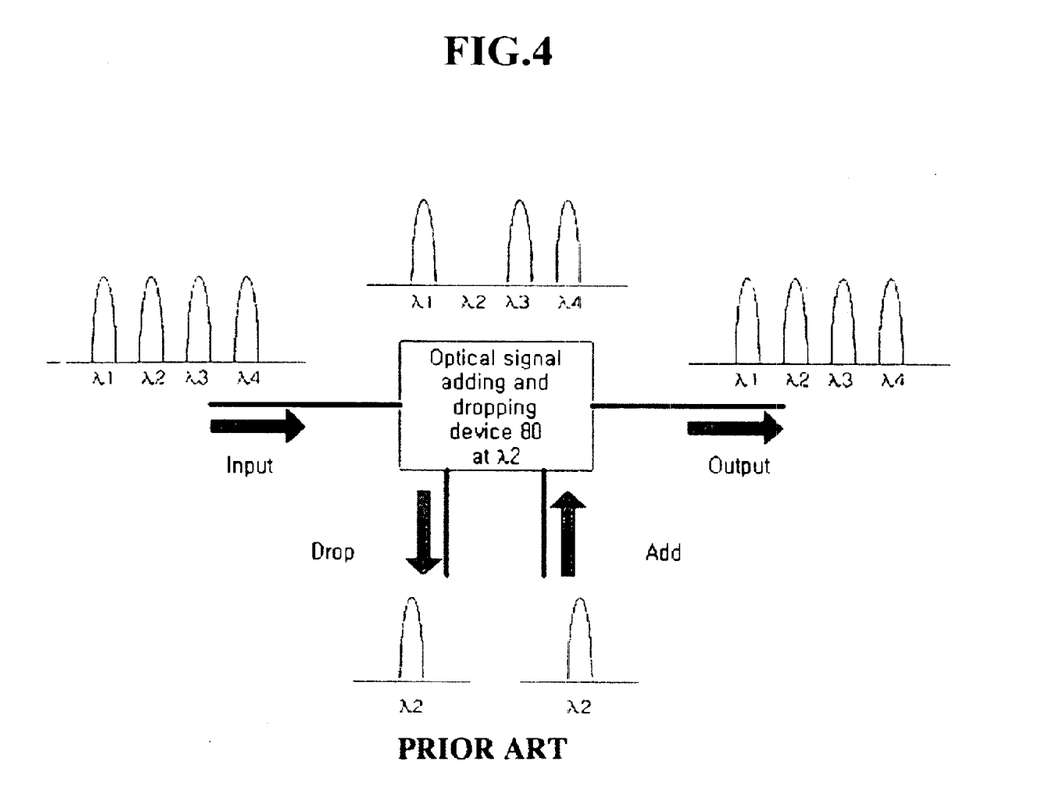
FIG. 4 shows a process for the device for adding and dropping optical signals to add and drop the optical signal having the center wavelength at $\lambda_2$.

FIG. 4 shows a process for adding and dropping the optical signal having the center wavelength at $\lambda_2$.

Since the device 80 for adding and dropping optical signals uses two three-port wavelength selective filter elements 821 and 822, it has a large amount of additional losses caused by transmission and reflection by wavelength selective thin film filter elements. Also, an additional process such as optical fiber fusion splicing process is needed for connecting the two thin film filters, and the cost multiplies as the size of the filter element enlarges.

SUMMARY OF THE INVENTION

It is an advantage of the present invention to provide a device for adding and dropping optical signal using a bulk dielectric optical thin film and a plurality of lens elements thereby reducing additional loss, and requiring no extra process such as the conventional optical fiber fusion splicing.

In one aspect of the present invention, a device for adding and dropping optical signal comprises:

an optical signal provided at an end unit of a free space wherein optical signals proceed in the device, for injecting/transmitting optical signals corresponding to multi-wavelengths, and adding/dropping optical signals corresponding to predetermined wavelengths;

a bulk dielectric optical thin film provided in the free space, for reflecting or transmitting the optical signals corresponding to the predetermined wavelengths from among the multi-wavelengths injected/added by the optical signal processor, transmitting or reflecting the optical signals corresponding to other wavelengths to add and drop the optical signals corresponding to the predetermined wavelengths;

first and second focusing lenses having the bulk dielectric optical thin film provided therebetween, for focusing the optical signals injected/added by the optical signal processor to allow them to proceed to the bulk dielectric optical thin film, focusing the optical signals passed through the bulk dielectric optical thin film to drop/transmit them to the optical signal processor; and first and second collimating lenses respectively provided between the bulk dielectric optical thin film and the first focusing lens, and between the bulk dielectric optical thin film and the second focusing lens, for allowing the optical signals focused by the first and second focusing lenses to proceed in parallel and be provided to the bulk dielectric optical thin film, and collimating the signals passed through the bulk dielectric optical thin film to allow the signals to proceed to the focusing lenses.

The optical signal processor comprises:

input/drop optical fibers including an input optical fiber for receiving multi-wavelength optical signals, and a drop optical fiber for dropping the optical signals corresponding to predetermined wavelengths; and add/output optical fibers including an add optical fiber for adding optical signals corresponding to predetermined wavelengths, and an output optical fiber for transmitting the optical signals transmitted through the added optical fiber and the bulk dielectric optical thin film.

The input/drop optical fibers and the add/output optical fibers respectively form a dual fiber termination on an object plane of the two focusing lenses.

The first and second focusing lenses are chosen so as to provide nominal 1-to-1 imaging of dual fiber termination along the image plane, respectively. The distance between the image plane and the object plane is varied, respectively.

The first focusing lens forms an object plane at the dual fiber termination of the input/drop optical fiber, and the second focusing lens forms an object plane at the dual fiber termination of the add/output optical fiber.

The first and second focusing lenses define the object plane and the image plane.

The first collimating lens provides the transmitted multi-wavelength optical signals from the input optical fiber to the bulk dielectric optical thin film through the first focusing lens in parallel, and allows the optical signals reflected by the bulk dielectric optical thin film to be transmitted in the reverse direction of the incidence direction and be focused at a predetermined point on the image plane, and the second collimating lens provides the added optical signal having a predetermined wavelength from add optical fiber to the bulk dielectric optical thin film through the second focusing lens in parallel, and allows the optical signals reflected by the bulk dielectric optical thin film to be focused at a predetermined point on the image plane.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 5:
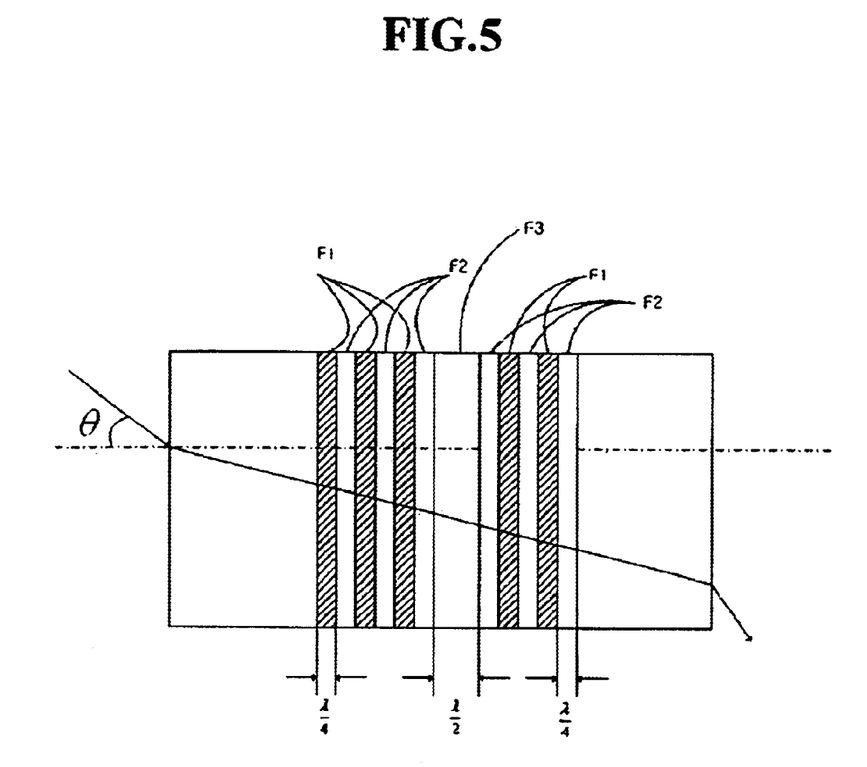
FIG. 5 shows a brief schematic diagram of a bulk dielectric optical thin film applied to the device for adding and dropping optical signals according to a preferred embodiment of the present invention.

FIG. 5 shows a brief schematic diagram of a bulk dielectric optical thin film applied to the device for adding and dropping optical signals according to a preferred embodiment of the present invention.

The bulk dielectric optical thin film is categorized as a transmittive dielectric optical thin film or a reflective dielectric optical thin film.

FIG. 5 shows the transmittive dielectric optical thin film filter, which has a laminated structure, comprising a plurality of the first laminated layers with $F_1$ and $F_2$, the second signal layer with $F_3$ and the third laminated layers with $F_1$ and $F_2$.

The thickness of the region $F_1$ is $\lambda/4$, and it is made of a substance having a relative high index of refraction such as $Ta_2O_5$ (tantala). The thickness of the region $F_2$ is $\lambda/4$, and it is made of a substance having a relative low index of refraction such as $SiO_2$ (silica). The thickness of the region $F_3$ is $\lambda/2$, and it is made of $Ta_2O_5$ having the same index of refraction as the region $F_1$.

In the first laminated layer, ten or more regions $F_1$ and the same number of regions $F_2$ are alternately stacked. This laminated layer is adhered to a glass substrate, and a surface thereof is covered and protected by a protection layer or a cover glass.

The transmittive dielectric optical thin film has bandpass characteristics for transmitting optical signals corresponding to predetermined wavelengths, and reflecting those corresponding to other wavelengths, from among the injected optical signals through the input port.

In this instance, the pass band is controlled by controlling the number of the regions $F_1$, $F_2$, and $F_3$ forming the thin film. Also, when the injected light beam is applied to a filter obliquely with a predetermined angle $\theta$ ($\theta \neq 0$) of incidence, the pass band or the center wavelength of a filter is determined according to the thickness of the layers in the direction of the light beam.

The reflective dielectric optical thin film is also designed in multi-layer thin films in the same manner as the transmittive dielectric optical thin film, but differing in the substances that form the regions $F_1$, $F_2$, and $F_3$.

That is, in the reflective dielectric optical thin film, the region $F_1$ is made of a low index of refraction substance such as $SiO_2$ (silica), the region $F_2$ is made of a high index of refraction substance such as $Ta_2O_5$ (tantala), and the region $F_3$ is made of a substance having the same index of refraction as that of the region $F_1$.

The reflective dielectric optical thin film has bandpass characteristics for reflecting optical signals corresponding to predetermined wavelengths, and transmitting those corresponding to other wavelengths, from among the optical signals injected through the input port.

The device for adding and dropping optical signals according to the preferred embodiment of the present invention uses the reflective dielectric optical thin film, and it can further use the transmittive dielectric optical thin film if needed.

Figure 6:
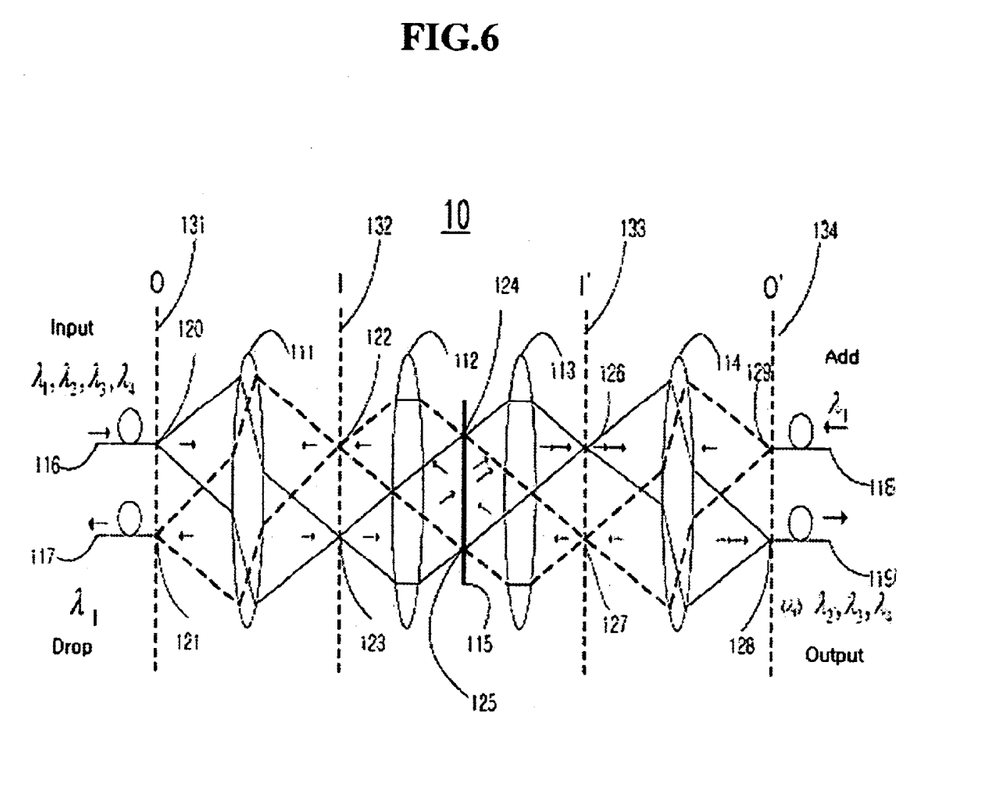
FIG. 6 shows a configuration of the device for adding and dropping optical signals according to a preferred embodiment of the present invention.

FIG. 6 shows a configuration of the optical signal adding and dropping device according to a preferred embodiment of the present invention.

As shown, the device 10 for adding and dropping optical signals comprises a bulk dielectric optical thin film 115, four lenses 111, 112, 113, and 114, and an optical signal processor.

Optical signals in the device 10 for adding and dropping optical signals proceed in the free space provided between the bulk dielectric optical thin film 115 and the lenses, and between the lenses, according to the direction determined by the bulk dielectric optical thin film 115 and the lenses.

The bulk dielectric optical thin film 115 as a reflective dielectric optical thin film reflects a predetermined wavelength, and transmits other wavelengths. Here, the bulk dielectric optical thin film 115 can use a transmittive dielectric optical thin film that transmits a predetermined wavelength and reflects other wavelengths.

The four lenses include first and second focusing lenses 111 and 114, and first and second collimating lenses 112 and 113. The first and second focusing lenses 111 and 114 are provided at the optical signal input port and the output port, and the first and second collimating lenses 112 and 113 together with the bulk dielectric optical thin film 115 provided therebetween are provided between the first and second focusing lenses 111 and 114.

The optical signal processor comprises an input optical fiber 116, a drop optical fiber 117, an add optical fiber 118, and an output optical fiber 119 provided at each dual fiber termination.

In the above-noted device for adding and dropping optical signals, when positioning the two focusing lenses provided in the single unit between the image plane and the object plane, proficiency of manufacturing the device can be increased by varying the distance of the two focusing lenses.

First, the first focusing lens 111 allows a first object plane 131 to be formed on the dual fiber termination 120 and 121 which is placed at the input optical fiber 116 to which the WDM signals are injected and the drop optical fiber 117 from which the optical signals corresponding to predetermined wavelengths are dropped.

The first collimating lens 112 is positioned between the bulk dielectric optical thin film 115 and a first image plane 132 formed by the first focusing lens 111.

The bulk dielectric optical thin film 115 is located between the first and second collimating lenses 112 and 113.

The second collimating lens 113 is positioned between the bulk dielectric optical thin film 115 and a second image plane 133 formed by the second focusing lens.

The second focusing lens 114 is installed behind the second collimating lens 113, and forms a second object plane 134 on the terminations 128 and 129 which is placed at the output optical fiber 119 and the add optical fiber 118, respectively.

The input and drop optical fibers 116 and 117 located at the first object plane 131 of the first focusing lens 111 form a dual fiber termination 120/121 so as to combine the input optical signals and the first focusing lens 111.

The first and second object planes 131 and 134 are denoted as vertical dotted lines O and O', and the first and second image planes 132 and 133 are denoted as vertical dotted lines I and I'.

As to an elemental placement of the general optical filter elements, the input and drop optical fibers 116 and 117 are fixed and placed in the single unit, such as a with a ferrule provided in an optical connector. That is, the distance between the two optical fibers 116 and 117 is fixed. In addition, in the above-noted device, when controlling the two focusing lenses provided in the single unit between the image plane and the object plane, proficiency of manufacturing the device can be increased by varying the distance of the two focusing lenses.

The add optical fiber 118 and the output optical fiber 119 form a dual fiber termination 128/129, and are provided on the second object plane 134 of the second focusing lens 114 so as to combine the output and added optical signals with the second focusing lens 114.

An operation of the device for adding and dropping optical signals will now be described.

First, an operation of dropping optical signals corresponding to predetermined wavelengths will be described.

WDM signals having different center wavelengths are provided to the input optical fiber 116, passed through the termination, and provided to the inside of the device 10, that is, a free space.

The optical signals are passed through the first focusing lens 111 to focus at the point 123 on the first image plane 132, then they proceed to the first collimating lens 112.

The collimating lens 112 collimates the optical signals having multi-wavelengths, and provides the collimated optical signals to the bulk dielectric optical thin film 115.

The bulk dielectric optical thin film 115 reflects the optical signals corresponding to the predefined wavelengths, and transmits the optical signals corresponding to other wavelengths without any interaction.

The optical signals corresponding to the wavelengths reflected by the bulk dielectric optical thin film 115 are again passed through the first collimating lens 112 to proceed in the reverse direction of the incidence direction and focus at the point 122 on the first image plane 132, wherefrom they continue through the first focusing lens 111 to proceed through the termination 121 of the drop optical fiber 117 to be output to the drop optical fiber 117.

An operation of adding the optical signals corresponding to the predetermined wavelengths will now be described.

The added optical signals having the center wavelength at $\lambda_1$ are provided through the add optical fiber 118 to the device 10.

The added optical signals proceed to the second focusing lens 114 to be passed therethrough, and they then focus at the point 127 on the second image plane 133.

The focused optical signals dispersedly proceed to the second collimating lens 113, and are provided in parallel to the bulk dielectric optical thin film 115 through the second collimating lens 113. Since the bulk dielectric optical thin film 115 has reflective characteristics on the optical signals corresponding to the predetermined wavelength at $\lambda_1$, the signals provided in parallel by the second collimating lens 113 are reflected in parallel to again proceed to the second collimating lens 113.

The second collimating lens 113 focuses the signals provided in parallel at the point 126 on the second image plane 133, and the optical signals focused at the point 126 dispersedly proceed to the second focusing lens 114. The optical signals pass through the second focusing lens 114 and are focused at the point 128 on the second object plane 134 and are output through the output optical fiber 119.

The added optical signals provided to the add optical fiber 118 are combined with optical signals that are transmitted by the bulk dielectric optical thin film 115 through it to proceed to the output optical fiber 119 from among WDM signals provided through the input optical fiber 116. Therefore, the optical signals transmitted to the output optical fiber 119 become as the initially injected WDM signals.

Figure 7:
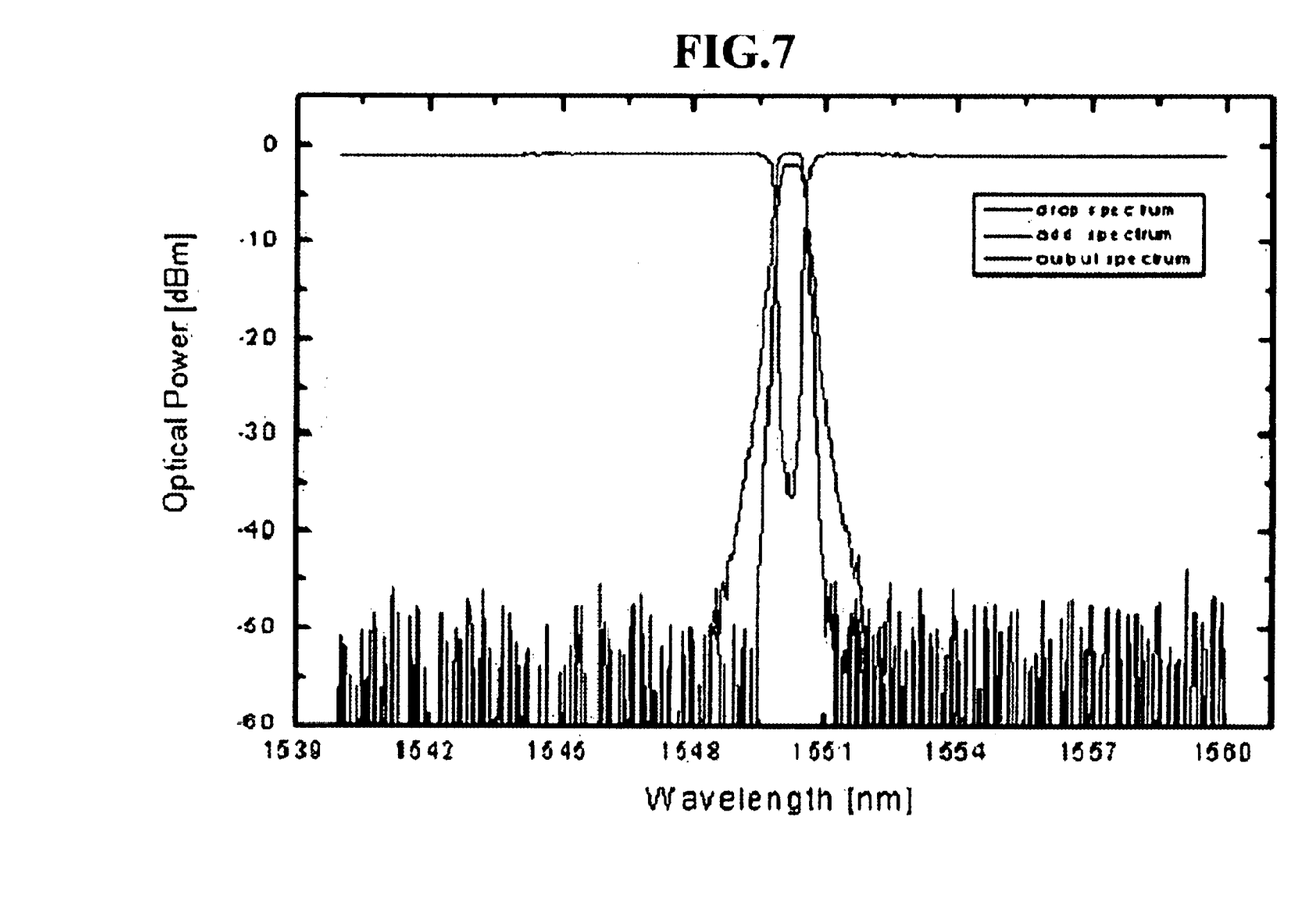
FIG. 7 shows a spectrum measurement result according to a preferred embodiment of the present invention.

FIG. 7 shows a transmitted and dropped spectrum measurement result using the proposed device for adding and dropping optical signals according to a preferred embodiment of the present invention.

As shown, results of measuring the spectrums at the drop optical fiber 117 and the output optical fiber 119 of the optical signal provide a good transmitting and dropping operation.

The input light source is a high power Super-Luminescent LED, and the spectrum is measured at the drop and the output port using an optical spectrum analyzer.

As described, the device for adding and dropping optical signals and the method thereof according to the preferred embodiment of the present invention uses a single bulk dielectric optical thin film and four lenses to add and drop the optical signals, thereby allow simpler configuration and manufacturing, and it remarkably reduces additional loss compared to the device of the conventional three-port wavelength selective filter in series/parallel connection.

Also, the device for adding and dropping optical signals removes the process of fusion splicing the conventional two three-port wavelength selective filters in series/parallel.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A device for adding and dropping optical signals comprising:

an optical signal provided at an end unit of a free space wherein optical signals proceed in the device, for injecting/transmitting optical signals corresponding to multi-wavelengths, and adding/dropping optical signals corresponding to predetermined wavelengths;

a bulk dielectric optical thin film provided in the free space, for reflecting or transmitting the optical signals corresponding to the predetermined wavelengths from among the multi-wavelengths injected/added by the optical signal processor, transmitting or reflecting the optical signals corresponding to other wavelengths to add and drop the optical signals corresponding to the predetermined wavelengths;

first and second focusing lenses for focusing the optical signals injected/added by the optical signal processor to allow them to proceed to the bulk dielectric optical thin film, focusing the optical signals passed through the bulk dielectric optical thin film to drop/transmit them to the optical signal processor; and first and second collimating lenses respectively provided between the bulk dielectric optical thin film and the first focusing lens, and between the bulk dielectric optical thin film and the second focusing lens, for allowing the optical signals focused at the first and second focusing lenses to proceed in parallel, and be provided to the bulk dielectric optical thin film, and collimating the signals passed through the bulk dielectric optical thin film to allow the signals to proceed to the focusing lenses.

2. The device of claim 1, wherein the optical signal processor comprises:

input/drop optical fibers including an input optical fiber for receiving multi-wavelength optical signals, and a drop optical fiber for dropping the optical signals corresponding to predetermined wavelengths; and add/output optical fibers including an add optical fiber for adding optical signals corresponding to predetermined wavelengths, and an output optical fiber for outputting the optical signals transmitted through the added optical fiber and the bulk dielectric optical thin film.

3. The device of claim 2, wherein the input/drop optical fibers and the add/output optical fibers form a dual fiber termination on an object plane, respectively.

4. The device of claim 2, wherein the first collimating lens provides in parallel the injected multi-wavelength optical signals from the input/optical fiber to the bulk dielectric optical thin film through the first focusing lens, and allows the optical signals reflected by the bulk dielectric optical thin film to be transmitted in the reverse direction of the incidence direction and be focused at a predetermined point on the image plane, and the second collimating lens provides in parallel the added optical signals from the add optical fiber to the bulk dielectric optical thin film through the second focusing lens, and allows the optical signals reflected by the bulk dielectric optical thin film to be focused at a predetermined point on the image plane.

5. The device of claim 1, wherein the first focusing lens forms an object plane at the dual fiber termination of the input/drop optical fiber, and the second focusing lens forms an object plane at the dual fiber termination of the add/output optical fiber.

6. The device of claim 5, wherein the first and second focusing lenses define the object plane and the image plane.

7. The device of claim 1, wherein the first and second focusing lenses respectively match the dual fiber termination on the object plane with individual focuses on an image plane, and vary the distance between the two focusing lenses between the image plane and the object plane.

* * * * *